US011960001B2

(12) United States Patent
Ford et al.

(10) Patent No.: US 11,960,001 B2
(45) Date of Patent: Apr. 16, 2024

(54) SYSTEMS AND METHODS FOR SIMULATING GNSS MULTIPATH AND OBSCURATION WITH NETWORKED AUTONOMOUS VEHICLES

(71) Applicant: Spirent Communications PLC, Crawley (GB)

(72) Inventors: Colin Richard Ford, Paignton (GB); Mark Geoffrey Holbrow, Paignton (GB); Steve Hickling, Paignton (GB); Mark Hunter, Paignton (GB); Guy Buesnel, Paignton (GB); Neil Bennett, Paignton (GB); Daniel Martin, Paignton (GB)

(73) Assignee: Spirent Communications, plc, Crawley (GB)

(*) Notice: Subject to any disclaimer, the term of this patent is extended or adjusted under 35 U.S.C. 154(b) by 94 days.

(21) Appl. No.: 17/111,506

(22) Filed: Dec. 4, 2020

(65) Prior Publication Data

US 2021/0173077 A1 Jun. 10, 2021

Related U.S. Application Data

(60) Provisional application No. 62/946,398, filed on Dec. 10, 2019.

(30) Foreign Application Priority Data

Sep. 16, 2020 (GB) ..................... 2014575

(51) Int. Cl.
*G01S 13/931* (2020.01)
*B60W 60/00* (2020.01)
(Continued)

(52) U.S. Cl.
CPC ............ *G01S 13/931* (2013.01); *G01S 13/02* (2013.01); *G01S 19/20* (2013.01); *G01S 19/21* (2013.01);
(Continued)

(58) Field of Classification Search
CPC ........ G01S 13/931; G01S 13/02; G01S 19/20; G01S 19/21; G01S 19/23; G01S 19/46; G01S 19/47; B60W 60/001; H04W 4/46
See application file for complete search history.

(56) References Cited

U.S. PATENT DOCUMENTS 9,660,739 B2 * 5/2017 Reed ....................... H04B 17/12
10,228,468 B1 * 3/2019 Wang ...................... G01S 19/22
(Continued)

FOREIGN PATENT DOCUMENTS

CN 102520420 A 6/2012
CN 102854518 A 1/2013
(Continued)

OTHER PUBLICATIONS

Goldin, "10 Advantages of Autonomous Vehicles", ITSdigest, https://www.itsdigest.com/10-advantages-autonomous-vehicles, Feb. 20, 2018, 6 pages.
(Continued)

*Primary Examiner* — Donald H B Braswell
(74) *Attorney, Agent, or Firm* — Haynes Beffel & Wolfeld LLP; Ernest J. Beffel, Jr.

(57) ABSTRACT

The disclosed technology teaches testing an autonomous vehicle: shielding a GNSS receiving antenna of the vehicle from ambient GNSS signals while the vehicle is under test and supplanting the ambient GNSS signals with simulated GNSS signals. Testing includes using a GNSS signal generating system: receiving the ambient GNSS signals using an antenna of the system and determining a location and
(Continued)

acceleration of the vehicle from the GNSS signals, accessing a model of an augmented environment that includes multipathing and obscuration of the GNSS signals along a test path, based on the determined location—generating the simulated GNSS signals to feed to the vehicle, in real time—simulating at least one constellation of GNSS satellite sources modified according to the augmented environment, based on the determined location, and feeding the simulated signals to a receiver in the vehicle, thereby supplanting ambient GNSS as the autonomous vehicle travels along the test path.

20 Claims, 5 Drawing Sheets

(51) Int. Cl.
*G01S 13/02* (2006.01)
*G01S 19/20* (2010.01)
*G01S 19/21* (2010.01)
*G01S 19/23* (2010.01)
*G01S 19/46* (2010.01)
*G01S 19/47* (2010.01)
*H04W 4/029* (2018.01)
*H04W 4/46* (2018.01)

(52) U.S. Cl.
CPC ............ *G01S 19/215* (2013.01); *G01S 19/23* (2013.01); *G01S 19/46* (2013.01); *G01S 19/47* (2013.01); *H04W 4/029* (2018.02); *G01S 2013/9322* (2020.01)

(56) References Cited

U.S. PATENT DOCUMENTS

| | | | |
|---|---|---|---|
| 11,479,213 B1* | 10/2022 | Kentley-Klay | ...... G05D 1/0246 |
| 2009/0243914 A1 | 10/2009 | Song et al. | |
| 2013/0338958 A1 | 12/2013 | Shanishchara et al. | |
| 2013/0345926 A1 | 12/2013 | Boulton et al. | |
| 2015/0355338 A1* | 12/2015 | Koebele | .................. G01S 19/23 |
| | | | 342/357.62 |
| 2017/0242129 A1* | 8/2017 | Kallankari | ......... G01R 29/0821 |
| 2018/0024250 A1* | 1/2018 | Nishi | ...................... G01S 19/23 |
| | | | 342/357.62 |
| 2018/0188379 A1* | 7/2018 | Whitworth | .............. G01S 19/21 |
| 2019/0257953 A1* | 8/2019 | Lennen | .................. G01S 19/22 |
| 2020/0249702 A1 | 8/2020 | Thurling | |

FOREIGN PATENT DOCUMENTS

| | | | | |
|---|---|---|---|---|
| CN | 103592660 A | | 2/2014 | |
| CN | 103954979 A | | 7/2014 | |
| CN | 209746132 U | | 12/2019 | |
| CN | 110794429 A | | 2/2020 | |
| FR | 3087012 | * | 4/2020 | ............. G01S 19/23 |

OTHER PUBLICATIONS

Jiang et al., "Towards an International Standard for Wireless Access in Vehicular Environments", IEE 802.11p, Jun. 2008, Mercedes-Benz Research & Development North America, Inc., pp. 2036-2040.
GB2014575.1—UK Search Report dated Mar. 10, 2021, 1 page.
GB2014575.1—UK Examination Report dated Feb. 19, 2024, 6 pages.

* cited by examiner

SYSTEMS AND METHODS FOR SIMULATING GNSS MULTIPATH AND OBSCURATION WITH NETWORKED AUTONOMOUS VEHICLES

FIELD OF THE TECHNOLOGY DISCLOSED

The technology disclosed relates generally to testing for connected and autonomous vehicles (CAVs). More specifically, the technology discloses a platform of CAV testing infrastructure with the inclusion of cyber-physical resilience testing capabilities. This testing infrastructure includes the measurement and evaluation of cyber-security resilience of CAVs positioning, navigation and timing (PNT) related functions.

CROSS REFERENCE

This application claims the benefit of and priority to U.S. application Ser. No. 62/946,398, entitled "Systems and Methods for Testing Connected and Autonomous Vehicles", filed Dec. 10, 2019. The priority application is incorporated by reference for all purposes.

This application claims the benefit of and priority to G.B. Application No. 2014575.1, entitled "Systems and Methods for Testing Connected and Autonomous Vehicles", filed Sep. 16, 2020. The priority application is incorporated by reference for all purposes.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Some vehicles are being deployed with autonomous functionality, such as self-parking or auto-collision avoidance features. Autonomous cars collect data with the help of various sensors fitted in them like cameras, LiDAR and radar and typically transmit this data to the cloud. Autonomous vehicles do not need connected vehicle technology to function since they must be able to independently navigate the road network. A connected car is a car that is equipped with Internet access, and usually also with a wireless local area network (LAN). This allows the car to share internet access, and hence data, with other devices both inside and outside the vehicle.

Connected Autonomous Vehicles (CAVs) offer the benefit of decreasing the frequency and severity of accidents, which can result in reducing traffic congestion. According to the USDOT website: "With 94 percent of fatal vehicle crashes attributable to human error, the potential of autonomous vehicle technologies to reduce deaths and injuries on our roads urges us to action." Under normal circumstances, human drivers naturally create stop-and-go traffic, even in the absence of bottlenecks, lane changes, merges or other disruptions. This phenomenon is called the 'phantom traffic jam.' U of Illinois researchers found that by controlling the pace of the autonomous car in the study, they were able to smooth out the traffic flow for all the cars. "Even decreasing the number of accidents could reduce congestion, because up to 25% of congestion is caused by traffic incidents," according to Study of the Potential Energy Consumption Impacts of Connected and Automated Vehicles, a report by the US Energy Information Administration (EIA).

Resilience of CAVs from a cyber-security context is critical to the impact they will have on society. There is evidence available that cyber-attacks on CAV systems will happen and also that CAVs could become collateral in attacks targeting other systems. Recently a group of security researchers working for an Israeli High-Tech company were able to successfully spoof a Tesla Model 3 Navigation system. Jammers and spoofers are becoming much more sophisticated and will be harder to detect without the development of specialized measures.

The challenge is how to deliver, rapidly and competitively, the economical, societal, and environmental benefits that CAVs to offer. To deliver the benefits, a platform of CAV testing and validation infrastructure is needed.

An opportunity arises for providing testing for autonomous vehicles and for connected vehicles that are connected to other vehicles and infrastructure.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of the summary is to present some concepts related to some exemplary non-limiting implementations in a simplified form as a prelude to the more detailed description of the various implementations that follow.

The disclosed technology teaches a method of testing a connected vehicle that is connected to other vehicles and/or infrastructure, including shielding a cellular receiving antenna of the connected vehicle from ambient cellular signals while the connected vehicle is under test and supplanting the ambient cellular signals with simulated cellular signals. The method includes using a cellular signal generating system, receiving the ambient cellular signals and ambient GNSS signals using at least one antenna of the cellular signal generating system and determining a location and acceleration of the connected vehicle from the ambient GNSS signals. The method also includes accessing a model of an augmented environment that includes multi-pathing and obscuration of the ambient cellular signals along a test path, based on the location determined from the cellular signals and generating the simulated cellular signals to feed to the connected vehicle, in real time, simulating with at least one vehicle and/or infrastructure source modified according to the augmented environment, based on for the location determined from the cellular signals. The method further includes feeding the simulated cellular signals to a receiver in the autonomous vehicle, thereby supplanting ambient cellular as the connected vehicle travels along the test path.

The technology also discloses testing an autonomous vehicle, including shielding a GNSS receiving antenna of the autonomous vehicle from ambient GNSS signals while the autonomous vehicle is under test and supplanting the ambient GNSS signals with simulated GNSS signals. The method includes using a GNSS signal generating system: receiving the ambient GNSS signals using an antenna of the GNSS signal generating system and determining a location and acceleration of the autonomous vehicle from the ambient GNSS signals, accessing a model of an augmented environment that includes at least multi-pathing and obscuration of the ambient GNSS signals along a test path, based on the location determined from the GNSS signals, and generating the simulated GNSS signals to feed to the autonomous vehicle, in real time, simulating at least one constellation of GNSS satellite sources modified according to the augmented environment, based on the location determined from the GNSS signals. The method further includes feeding the simulated GNSS signals to a receiver in the autonomous vehicle, thereby supplanting ambient GNSS as the autonomous vehicle travels along the test path.

Of course, the cellular and GNSS testing can be combined for testing a CAV. Cellular and/or GNSS testing can be enhanced using an inertial measurement unit to improve on accuracy of location determination from GNSS signals, especially under jerk conditions. Alternatively, to cellular communications, advanced IEEE 802.11 family standards for RF communication can be tested. In addition, the system can be applied to test feedback from onboard fusion systems.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

GPS (Global Positioning) and GNSS (Global Navigation Satellite Systems) yield very accurate positioning, velocity and timing. GPS/GNSS positioning and navigation have grown in importance due to the world-wide availability and high accuracy of positions and velocity calculated from GPS/GNSS signals, which can be obtained almost anywhere under the open sky. In this document, GNSS will be used as inclusive of GPS and LOE technologies. The positioning, navigation and timing functions (PNT) are widely used to show the current location and path forward, which is crucial for connected and autonomous vehicles (CAV). In addition, a wide range of different sensors, among them optical, LIDAR and RADAR are used to detect obstacles and street marks.

The disclosed hardware-software suite for GNSS reception, simulation and emulation can be placed onto/into CAVs at any stage of conception. The following solution will apply testing to autonomous vehicles, and to a connected vehicle that is connected to other connected vehicles and infrastructure. Next, we describe an example architecture for testing autonomous vehicles and for testing a connected vehicle that is connected to other vehicles and/or infrastructure.

Architecture

Figure 1:
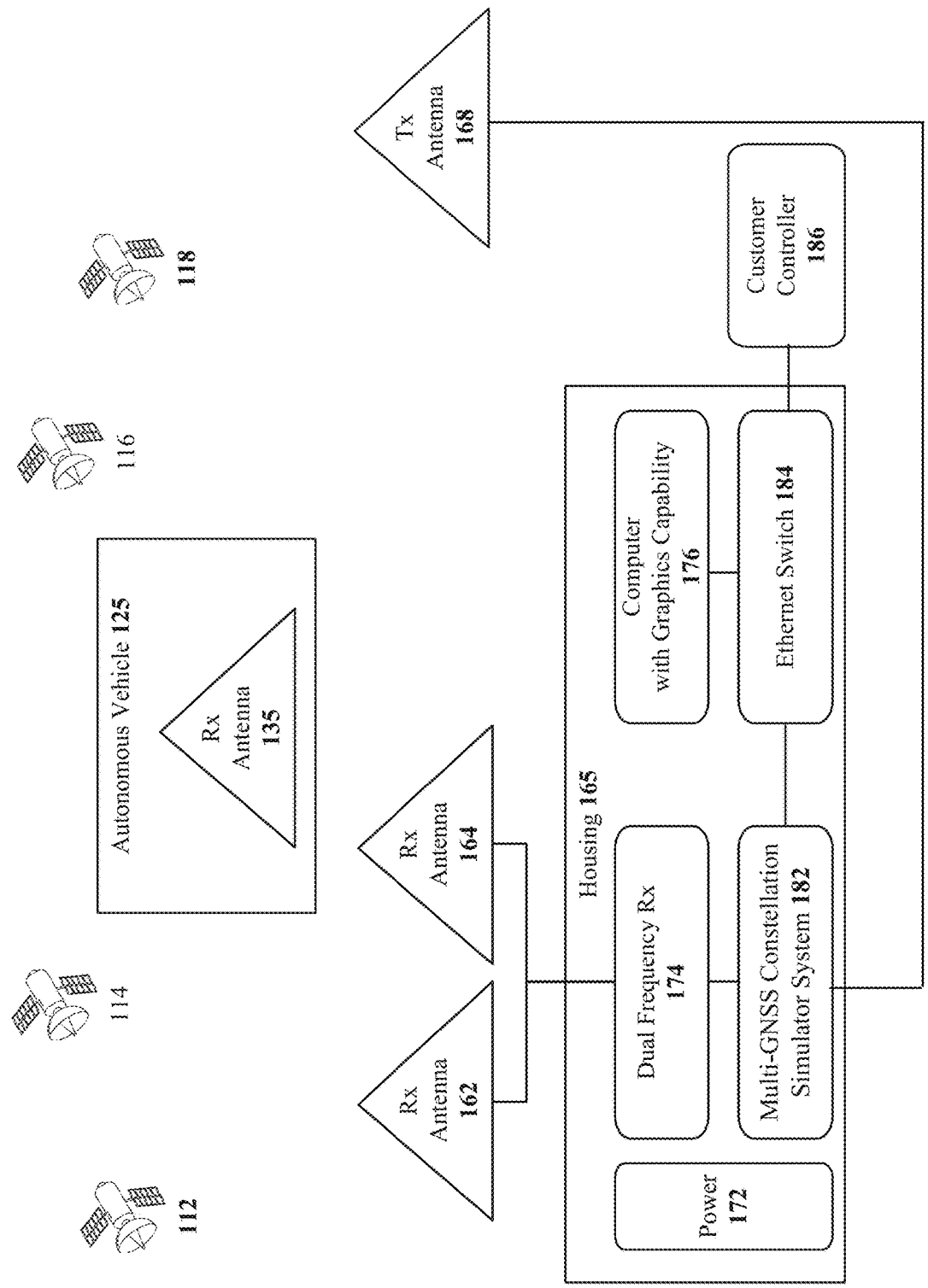
FIG. 1 depicts an exemplary system for testing autonomous vehicles and for testing a connected vehicle that is connected to other vehicles. according to one implementation of the technology disclosed.

FIG. 1 shows example architecture 100 for testing autonomous vehicles and for testing a connected vehicle that is connected to other vehicles. Architecture 100 includes satellites 112, 114, 116, 118. Each satellite can be one of Global Navigation Satellite Systems (GNSS) or low earth orbit (LOE) or another satellite type. Architecture 100 includes autonomous vehicle 125 with receiving antenna 135. Architecture 100 further includes Multi-GNSS Constellation Simulator System 182, which can be a Spirent GSS7000 system in one implementation. In another implementation, Multi-GNSS Constellation Simulator System 182 can be a Spirent GSS9000. Architecture 100 also includes dual frequency receiver 174 that receives position outputs from receiving antennas 162, 164 and converts the information to motion and feeds the results to GNSS Constellation Simulator System 182. The simulator system has up to 256 output channels, and onboard SimGEN processing for following the motion of the vehicle, using the motion of the car which I fed into the simulator system. GNSS Constellation Simulator System 182 sends signals, typically over-the-air (OTA), to transmit antenna 168 which is typically placed in a small chamber over the GNSS antenna of autonomous vehicle 125.

Some environments pose particular challenges to GPS/GNSS signal reception, as these signals are transmitted by moving satellites, which are distributed across the visible sky. To increase accuracy, availability and integrity, GNSS correction data can be used and additional sensors can be integrated into the onboard navigation system. Much higher accuracy can be achieved by a method called Real Time Kinematic (RTK), using carrier phase measurements, where a mobile reference station transmits GPS/GNSS correction data to a rover receiver over the air. RTK is a method for real-time correction. Higher availability, accuracy and integrity of positioning can be achieved by a combination of GPS/GNSS with inertial measurements units (IMU), containing different inertial navigation sensors (INS). GNSS Constellation Simulator System 182 receives IMU information in some implementations.

Continuing the description of FIG. 1, architecture 100 further includes computer 176 with graphics capability and customer controller 186. Computer 176 is typically a small form factor PC with at least GTX1050 GPU graphics capability, for running a modelling system such as Sim3D, a 3D that creates a realistic environment for the testing of multipath and obscuration effects using the GPU card. Simulated GNSS signals interact with fully customizable models and environments, giving detail, control and realism. The model has roads that match the car's path on a real road and includes the option to calculate multipathing and obscuration in real time. Virtual buildings can block signals for a real autonomous vehicle, which can also utilize line of sight to a virtual satellite, based upon real live sky. Customer controller 186 loads required three dimensional maps and RINEX files and sets the time and start and stop simulations, in one implementation. Customer controller 186 can also complete additional functions, as desired. Receiver Independent Exchange format (RINEX) is the standard data interchange format for raw satellite navigation system data, that allows the management and disposal of the measures generated by a receiver. In another implementation, the files can be in YUMA format, an ASCII message containing the almanac elements of each GPS satellite.

Further continuing the description of architecture 100, ethernet switch 184 manages data flow between customer controller 186, computer 176 and GNSS Constellation Simulator System 182. Power 182 supplies power to ethernet switch 184, customer controller 186, computer 176, GNSS Constellation Simulator System 182 and dual frequency receiver 174, that are typically mounted in a small rack in housing 165. Power 182 plugs into the in-vehicle power in many implementations. Housing 165 secures the equipment and enables it to be moved readily between vehicles. Housing 165 is commonly mounted in the trunk, aka the boot, of the autonomous vehicle.

Figure 2:
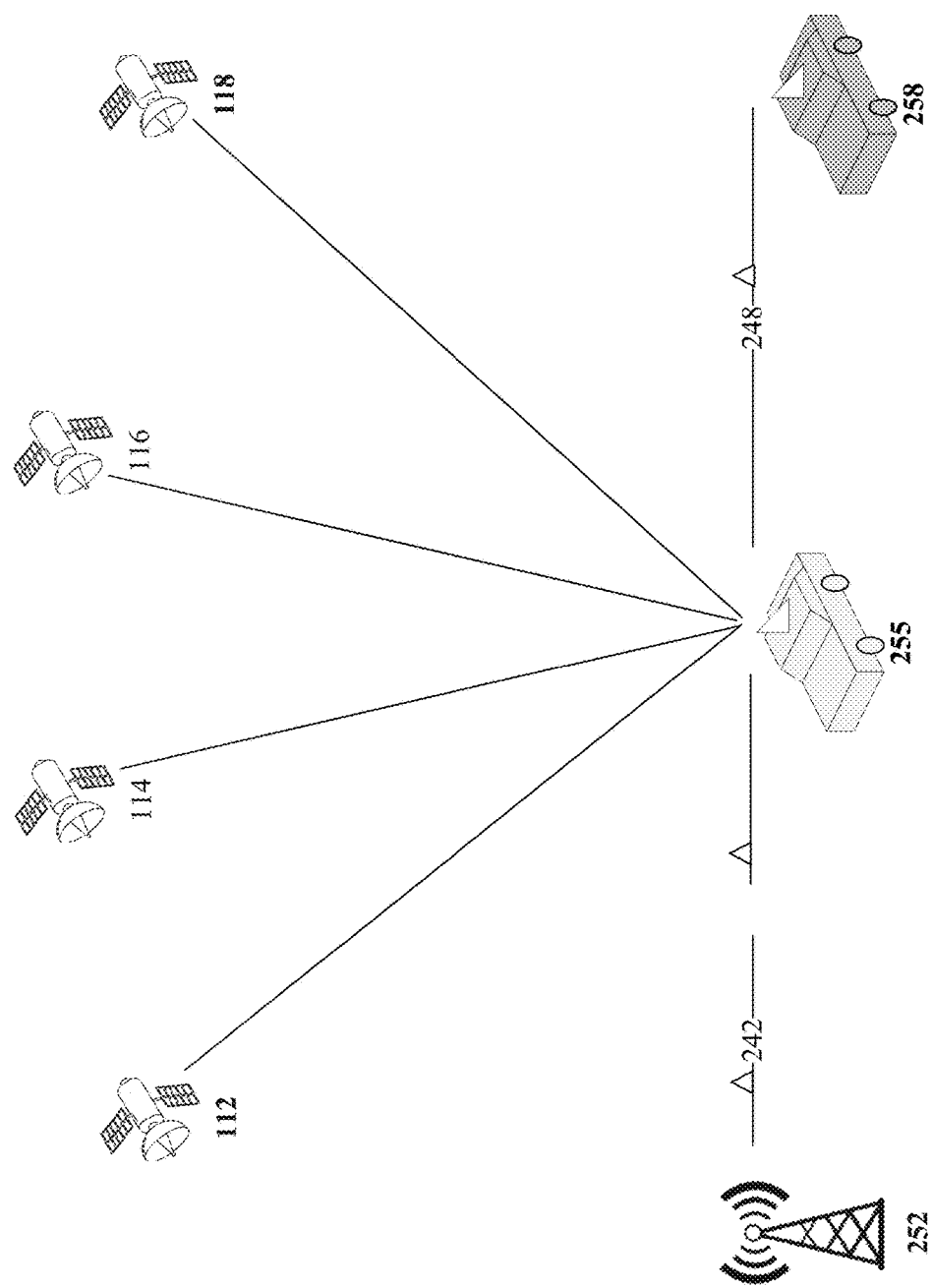
FIG. 2 shows an example normal live sky environment for testing autonomous vehicles and for testing a connected vehicle that is connected to other vehicles, with four satellites.

FIG. 2 shows an example normal live sky environment for testing autonomous vehicles and for testing a connected vehicle that is connected to other vehicles, with four satellites 112, 114, 116, 118. Each satellite can be one of Global Navigation Satellite Systems (GNSS) or low earth orbit (LOE) or another satellite type. Signals from the four satellites are transferred to and from the antenna on the top of ego vehicle 255 aka the autonomous vehicle under test, which includes receive and transmit services for GNSS, cellular and Wi-Fi. The antenna can be located in a different location on ego vehicle 255 in another implementation. Cell tower 252 operates using 5G or LTE 242.

Car to Car communication (C2C or V2V), technology can employ the IEEE 802.11p standard for the exchange of messages between cars, with location, heading, trajectory, and special events of the current vehicle, which are being broadcast to all vehicles in the vicinity, or a cellular variation on the WiFi standard. IEEE 802.11p, an approved amendment to the IEEE 802.11 standard, adds wireless access in vehicular environments (WAVE), a vehicular communication system. IEEE 802.11p defines enhancements to 802.11 required to support Intelligent Transportation Systems (ITS) applications. Similar to V2V, Vehicle to Infrastructure (V2I) is usable for informing drivers ahead of time about obstacles, red traffic lights and other vehicles or pedestrians approaching a crossing, possibly invisible due to buildings and vegetation. Vehicle-to-everything (V2X) includes vehicle-to-vehicle (V2V) and (V2I) vehicle to infrastructure (V2I) communication that enables vehicles to communicate with various elements of the traffic and the environment around them, using short-range wireless signals. Though mainly geared toward safety, V2X offers mundane convenience benefits, such as automatic payment for tolls. FIG. 2 shows ego vehicle 255 in peer-to-peer communication 248 via Dedicated Short Range Communications (DSRC) IEEE 802.11p to traffic 258. In another implementation, cellular V2X over LTE or 5G or another cellular network can be used as well as, or instead of DSRC for V2X.

Figure 3:
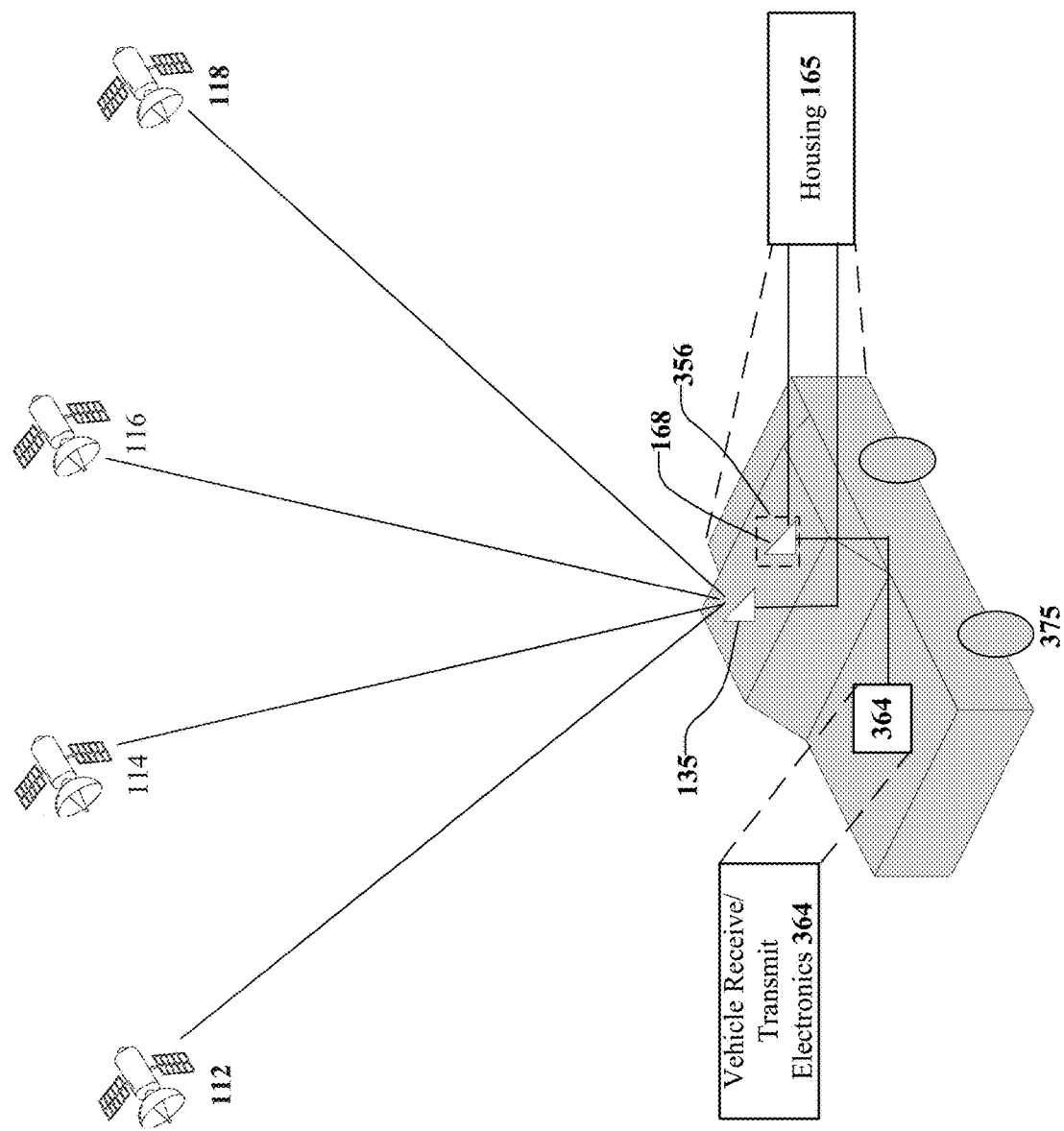
FIG. 3 shows an example use case with simulated signals in a real vehicle environment for testing autonomous vehicles and for testing a connected vehicle that is connected to other vehicles, with four satellites.

FIG. 3 shows an example use case with simulated signals in a real vehicle environment for testing autonomous vehicles and for testing a connected vehicle that is connected to other vehicles, with four satellites 112, 114, 116, 118. Signals from the four satellites are transferred to the live sky antenna 135, which includes receive and transmit services for GNSS, cellular and Wi-Fi—on the top of vehicle 375. The antenna can be located in a different location on vehicle 375 in another implementation. Vehicle 375 also includes housing 165 which includes GNSS Constellation Simulator System 182, dual frequency receiver 174, computer 176 and ethernet switch 184, described earlier. GNSS Constellation Simulator System 182 receives signals from satellites 112, 114, 116, 118 via live sky antenna 135 and simulates and sends signals to transmit antenna 168. The simulated antenna signals are shielded using a Faraday cage 356 or Faraday shield enclosure to block electromagnetic fields, to protect from external radio frequency interference (RFI) and to prevent the simulated signals from interfering with nearby sensitive equipment. Simulated signals can be used to test GNSS, Wi-Fi, 5G and LTE signals.

Figure 4:
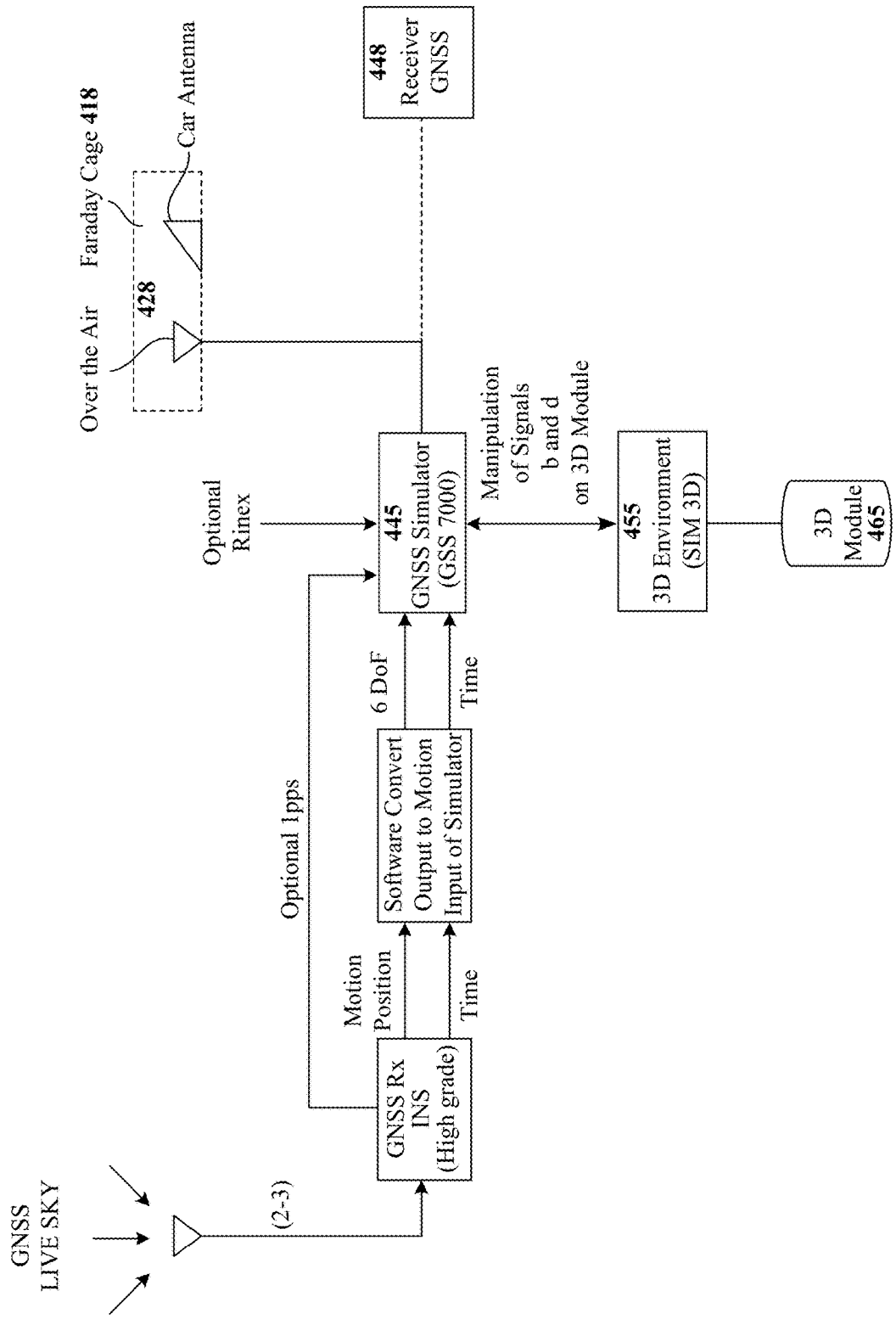
FIG. 4 shows an example workflow in which a simulator can follow the motion of real vehicle, adding in any user required effects such as multipath, obscuration, interference and spoofing.

FIG. 4 shows an example workflow 400 in which a GNSS simulator 445 can follow the motion of a real vehicle, adding in any user required effects such as multipath, obscuration, interference and spoofing. Alternatively, if access to the autonomous vehicle under test is available, then the connection to the vehicle can be direct 448, instead of simulated. Access can include over the air signals received via vehicle antenna 428, often encased in a Faraday cage for signal isolation. Simulation via GNSS simulator 445 can be extended to allow for other simulators, such as 5G, LTE, Wi-Fi. Effects such as interference, V2X message complications or manipulation, such as using an incorrect time, wrong location, etc. can then be added into the other simulators such as 3D environment (SIM 3D) 455 with 3D module 465.

Testing Track and Proving Grounds Use Case

One example use for the disclosed autonomous vehicle testing is use at testing tracks for vehicle certification and validation. Most vehicle testing tracks and proving grounds have long and varied road systems but do not have physically built infrastructure or varied environmental structures. This means that when they are testing a vehicle's functional safety and systems, they always have a good view of the sky and hence the vehicles GNSS receiver can track GNSS satellites easily and produce a very good estimation of position, velocity etc. The disclosed technology will allow these type of facilities to stimulate the vehicles GNSS receiver as though it is driving through any type of environment, from a deep urban environment to a forest and anything in between. The track and the required environment would be first modelled within the 3D environment model simulation software and then used, in real time, to calculate the obscuration, multipath and other impairments from the scene. These calculations would be applied in real time to the RF signal of the GNSS simulator and output either directly into the vehicle's receiver of over-the-air to the vehicle's antenna, thereby affecting the vehicles navigation unit as if the vehicle was actually driving through a corresponding real environment.

Track testing could be extended to street testing. Caution is indicated in alerting users in advance of any signal degradation or spoofing that would be tested, so that on board personnel are prepared to take control and safeguard surroundings from malfunctioning of a vehicle. Typically, street testing would follow track testing. In preparation for street testing, ambient signals on the street could be recorded and compared to modelled signals. In addition, the modelled signals and degradation or spoofing could be track tested. Based on track testing, the on board personnel could be alerted as to past vehicle behavior under the degradation or spoofing conditions being tested.

Vehicle Vulnerability Testing Use Case

GNSS spoofing and jamming as reported in the press are becoming more commonplace. The disclosed technology allows for the testing of the complete vehicle package against these types of cyber-attacks, including intentional or unintentional navigation data errors, in a controlled manner without impacting other vehicles or infrastructure. During a test, the trajectory of the real vehicle is fed to the simulator. The real vehicle only ever receives the simulated signal and therefore any impairment or spoofing/jamming attack can be activated in real-time while the vehicle is moving or stationary to test the vehicle's resilience against the controlled attack. Since the type of vehicle is agnostic to the simulator these tests could be carried out on passenger vehicles, military vehicles and autonomous vehicles.

Autonomous Vehicle Sensor Fusion Testing Use Case

Within real built up environments an autonomous vehicle's sensors are receiving coherent sensor information from the environment. With the disclosed technology, all RF (GNSS, Wi-Fi, 5G, LTE) signals can be manipulated and impaired to test the autonomous vehicle's situational awareness and fusion algorithms in fully controlled and challenging RF environments. The GNSS position can be manipulated so that the vehicle believes it is in different geolocation within its onboard HD map to where it actually is located, whereby causing the vehicle confusion when trying to map LiDAR data against HD map data. V2X message data can be manipulated, and impaired with noise, so as to make a vehicle "appear to the system" as if it is in front of the vehicle under test. This would cause the sensors to be at odds with the V2X data and test the resilience and vulnerability of the autonomous systems further.

Next, we describe a computer system usable to test an autonomous vehicle.

Computer System

Figure 5:
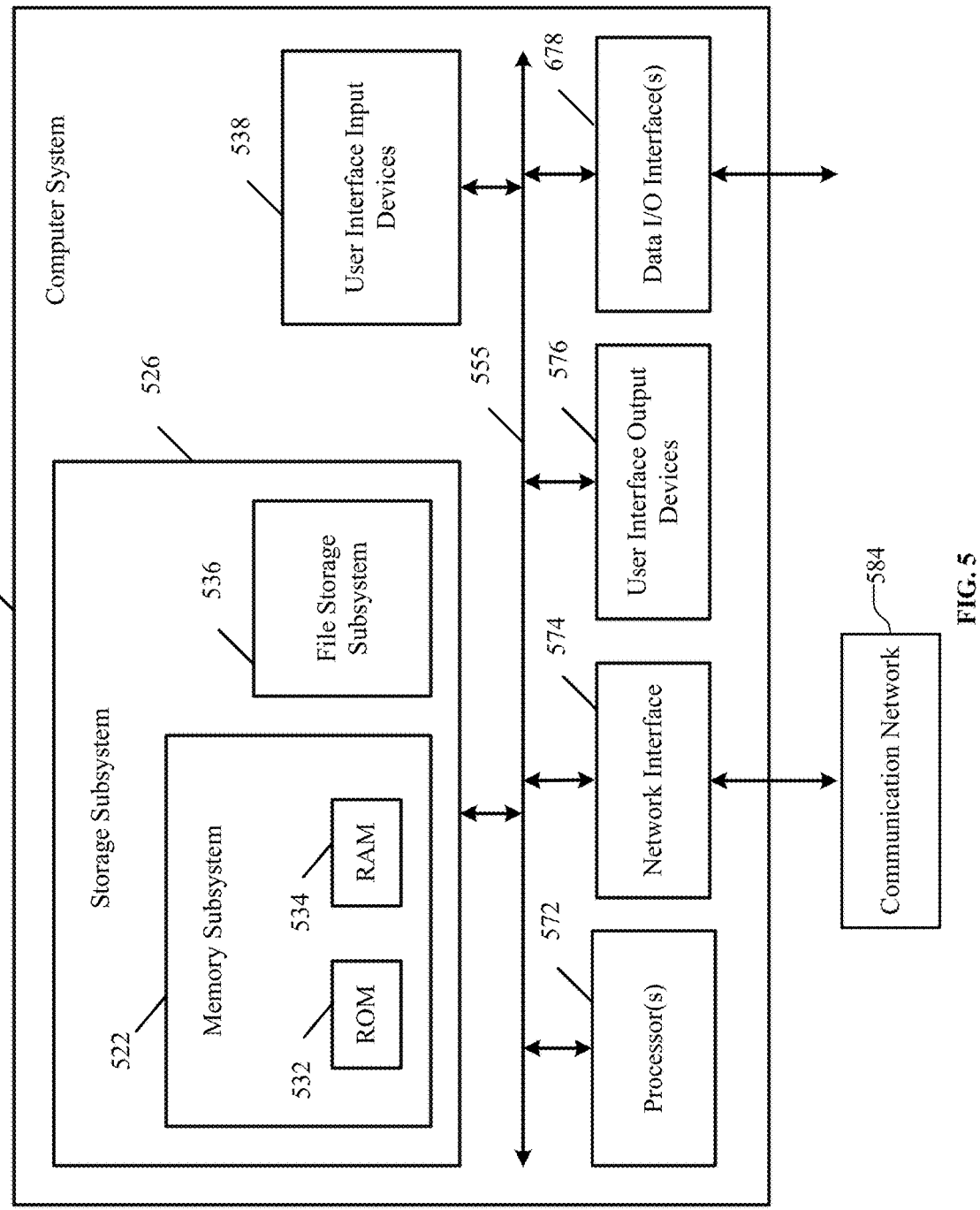
FIG. 5 depicts a block diagram of an exemplary system for testing autonomous vehicles, according to one implementation of the technology disclosed.

FIG. 5 is a simplified block diagram of a computer system 510 that can be used for testing autonomous vehicles, according to one implementation of the technology disclosed.

Computer system 500 includes at least one central processing unit (CPU) 572 that communicates with a number of peripheral devices via bus subsystem 555. These peripheral devices can include a storage subsystem 526 including, for example, memory devices and a file storage subsystem 536, user interface input devices 538, user interface output devices 576, and a network interface subsystem 574. The input and output devices allow user interaction with computer system 500. Network interface subsystem 574 provides an interface to a communication network 584, and to corresponding interface devices in other computer systems.

In one implementation, the customer controller 186 of FIG. 1 can be communicably linked to the storage subsystem 526 and the user interface input devices 538. User interface input devices 538 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 500.

User interface output devices 576 can include a display subsystem, a printer, a fax machine, or non-visual displays such as audio output devices. The display subsystem can include an LED display, a flat-panel device such as a liquid crystal display (LCD), a projection device, a cathode ray tube (CRT), or some other mechanism for creating a visible image. The display subsystem can also provide a non-visual display such as audio output devices. In general, use of the term "output device" is intended to include all possible types of devices and ways to output information from computer system 500 to the user or to another machine or computer system.

Storage subsystem 526 stores programming and data constructs that provide the functionality of some or all of the modules and methods described herein.

Memory subsystem 522 used in the storage subsystem 510 can include a number of memories including a main random access memory (RAM) 532 for storage of instructions and data during program execution and a read only memory (ROM) 534 in which fixed instructions are stored. A file storage subsystem 536 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 536 in the memory subsystem 522, or in other machines accessible by the processor.

Bus subsystem 555 provides a mechanism for letting the various components and subsystems of computer system 500 communicate with each other as intended. Although bus subsystem 555 is shown schematically as a single bus, alternative implementations of the bus subsystem can use multiple busses.

Computer system 500 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 500 depicted in FIG. 5 is intended only as a specific example for purposes of illustrating the preferred embodiments of the present invention. Many other configurations of computer system 500 are possible having more or less components than the computer system depicted in FIG. 5.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

Some Particular Implementations

Some particular implementations and features are described in the following discussion.

In one implementation, a disclosed method of testing an autonomous vehicle includes shielding a Global Navigation Satellite System (GNSS) receiving antenna of the autonomous vehicle from ambient GNSS signals while the autonomous vehicle is under test and supplanting the ambient GNSS signals with simulated GNSS signals. The method includes, using a GNSS signal generating system, receiving the ambient GNSS signals using an antenna of the GNSS signal generating system and determining a location and acceleration of the autonomous vehicle from the ambient GNSS signals. The method also includes accessing a model of an augmented environment that includes at least multipathing and obscuration of the ambient GNSS signals along a test path, based on the location determined from the GNSS signals. The method further includes generating the simulated GNSS signals to feed to the autonomous vehicle, in real time, simulating at least one constellation of GNSS satellite sources modified according to the augmented environment, based on the location determined from the GNSS signals, and feeding the simulated GNSS signals to a receiver in the autonomous vehicle, thereby supplanting ambient GNSS as the autonomous vehicle travels along the test path.

This method and other implementations of the technology disclosed can include one or more of the following features and/or features described in connection with additional methods disclosed. In the interest of conciseness, the combinations of features disclosed in this application are not individually enumerated and are not repeated with each base set of features.

Some implementations of the disclosed method further include spoofing by substituting pirate signals for ambient GNSS as the autonomous vehicle travels along the test path. Some implementations further include wireless and conductive feeds of the simulated GNSS signals. In one example, spoofing practically means stealing a car, and making the GNSS think that the car is still parked. In another example, pranksters spoof vehicles. For example, hackers in Israel made a Tesla pull off the road at an unplanned exit. Disclosed testing results can be used for validation, which can be used to train vehicles to recognize the spoof and reduce reliance on the GNSS.

Many implementations of the disclosed method use a Faraday cage to shield the intent of the autonomous vehicle. Some implementations include coupling the received ambient GNSS signals with inertial measurements unit (IMU) input to determine the position of the vehicle in real time with reduced latency.

Some implementations of the disclosed method include operating the vehicle on a track and simulating buildings. Other implementations of the disclosed method include operating the vehicle in an urban environment and combining the impaired GNSS signals with object sensors (visual, LIDAR, SONAR, RADAR) used by the car for navigation.

Some implementations of the disclosed method further include operating the vehicle in an urban environment and combining the impaired GNSS signals with vehicle to vehicle (V2V) and vehicle to infrastructure (V2I) communications used by the vehicle for navigation.

Another disclosed implementation of a method of testing a connected vehicle that is connected to other vehicles and/or infrastructure, includes shielding a cellular receiving antenna of the connected vehicle from ambient cellular signals while the connected vehicle is under test and supplanting the ambient cellular signals with simulated cellular signals. The method includes using a cellular signal generating system, receiving the ambient cellular signals and ambient Global Navigation Satellite System (GNSS) signals using at least one antenna of the cellular signal generating system and determining a location and acceleration of the connected vehicle from the ambient GNSS signals. The method also includes accessing a model of an augmented environment that includes at least multi-pathing and obscuration of the ambient cellular signals along a test path, based on the location determined from the cellular signals. The method further includes generating the simulated cellular signals to feed to the connected vehicle, in real time, simulating with at least one vehicle and/or infrastructure source modified according to the augmented environment, based on for the location determined from the cellular signals, and feeding the simulated cellular signals to a receiver in the autonomous vehicle, thereby supplanting ambient cellular as the connected vehicle travels along the test path.

For some implementations of the disclosed method, the ambient signals include at least one of GNSS, Wi-Fi, 5G and LTE signals that can be manipulated and impaired to test situational awareness of the vehicle in fully controlled and challenging RF environments.

One disclosed implementation of a method for repeatably testing vehicle mounted navigation systems includes integrating a GNSS simulator into a car, portably and providing signals to a navigation system on the car. The method also includes programming the GNSS simulator with an impaired environment to modify real GNSS signals according to the impaired environment, and as the car is traveling through a real-world environment, which corresponds to the programmed impaired environment, detecting the position of the car in real time by receiving real GNSS signals, modifying the real GNSS signals to produce impaired GNSS signals in near real time, with a latency of less than 50 milliseconds.

In another implementation, a disclosed system includes one or more processors coupled to memory, the memory loaded with computer instructions, when executed on the processors, implement actions of the disclosed method described supra.

In yet another implementation a disclosed tangible non-transitory computer readable storage media is impressed with computer program instructions that, when executed on a processor, implement the disclosed methods described supra.

The technology disclosed can be practiced as a system, method, or article of manufacture. One or more features of an implementation can be combined with the base implementation. Implementations that are not mutually exclusive are taught to be combinable. One or more features of an implementation can be combined with other implementations.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:
1. A method of testing an autonomous vehicle, including
   shielding a Global Navigation Satellite System (abbreviated GNSS) receiving antenna of the autonomous vehicle from ambient GNSS signals while the autonomous vehicle is under test and supplanting the ambient GNSS signals with simulated GNSS signals;
   using a GNSS signal generating system,
      receiving the ambient GNSS signals using an antenna of the GNSS signal generating system and determining a location and acceleration of the autonomous vehicle from the ambient GNSS signals;
      accessing a model of an augmented environment that includes at least multi-pathing and obscuration of the ambient GNSS signals along a test path, based on the location determined from the GNSS signals;
      generating the simulated GNSS signals to feed to the autonomous vehicle, in real time, simulating at least one constellation of GNSS satellite sources modified according to the augmented environment, based on the location determined from the GNSS signals; and feeding the simulated GNSS signals to a receiver in the autonomous vehicle, thereby supplanting ambient GNSS as the autonomous vehicle travels along the test path.

2. The method of claim 1, further including spoofing by substituting pirate signals for ambient GNSS as the autonomous vehicle travels along the test path.

3. The method of claim 1, further including wireless and conductive feeds of the simulated GNSS signals.

4. The method of claim 1, further including using a Faraday cage to shield intent of the autonomous vehicle.

5. The method of claim 1, further including coupling the received ambient GNSS signals with inertial measurements unit (abbreviated IMU) input to determine the position of the vehicle in real time with reduced latency.

6. The method of claim 1, further including operating the vehicle on a track and simulating buildings.

7. The method of claim 1, further including operating the vehicle in an urban environment and combining impaired GNSS signals with object sensors (visual, LIDAR, SONAR, RADAR) used by the vehicle for navigation.

8. The method of claim 1, further including operating the vehicle in an urban environment and combining impaired GNSS signals with vehicle to vehicle (abbreviated V2V) and vehicle to infrastructure (Abbreviated V2I) communications used by the vehicle for navigation.

9. A method of testing a connected vehicle that is connected to other vehicles and/or infrastructure, including:

shielding a cellular receiving antenna of the connected vehicle from ambient cellular signals while the connected vehicle is under test and supplanting the ambient cellular signals with simulated cellular signals;

using a cellular signal generating system, receiving the ambient cellular signals and ambient Global Navigation Satellite System (abbreviated GNSS) signals using at least one antenna of the cellular signal generating system and determining a location and acceleration of the connected vehicle from the ambient GNSS signals;

accessing a model of an augmented environment that includes at least multi-pathing and obscuration of the ambient cellular signals along a test path, based on the location determined from the cellular signals;

generating the simulated cellular signals to feed to the connected vehicle, in real time, simulating with at least one vehicle and/or infrastructure source modified according to the augmented environment, based on for the location determined from the cellular signals; and feeding the simulated cellular signals to a receiver in the connected vehicle, thereby supplanting ambient cellular as the connected vehicle travels along the test path.

10. The method of claim 9, wherein the ambient signals include at least one of GNSS, Wi-Fi, 5G and LTE signals that can be manipulated and impaired to test situational awareness of the vehicle in fully controlled and challenging RF environments.

11. A tangible non-transitory computer readable storage media impressed with computer program instructions that, when executed, test an autonomous vehicle, including shielding a Global Navigation Satellite System (abbreviated GNSS) receiving antenna of the autonomous vehicle from ambient GNSS signals while the autonomous vehicle is under test and supplanting the ambient GNSS signals with simulated GNSS signals;

using a GNSS signal generating system, receiving the ambient GNSS signals using an antenna of the GNSS signal generating system and determining a location and acceleration of the autonomous vehicle from the ambient GNSS signals;

accessing a model of an augmented environment that includes at least multi-pathing and obscuration of the ambient GNSS signals along a test path, based on the location determined from the GNSS signals;

generating the simulated GNSS signals to feed to the autonomous vehicle, in real time, simulating at least one constellation of GNSS satellite sources modified according to the augmented environment, based on the location determined from the GNSS signals; and feeding the simulated GNSS signals to a receiver in the autonomous vehicle, thereby supplanting ambient GNSS as the autonomous vehicle travels along the test path.

12. The tangible non-transitory computer readable storage media of claim 11, further including spoofing by substituting pirate signals for ambient GNSS as the autonomous vehicle travels along the test path.

13. The tangible non-transitory computer readable storage media of claim 11, further including wireless and conductive feeds of the simulated GNSS signals.

14. The tangible non-transitory computer readable storage media of claim 11, further including using a Faraday cage to shield intent of the autonomous vehicle.

15. The tangible non-transitory computer readable storage media of claim 11, further including coupling the received ambient GNSS signals with inertial measurements unit (abbreviated IMU) input to determine the position of the vehicle in real time with reduced latency.

16. The tangible non-transitory computer readable storage media of claim 11, further including operating the vehicle on a track and simulating buildings.

17. The tangible non-transitory computer readable storage media of claim 11, further including operating the vehicle in an urban environment and combining impaired GNSS signals with object sensors (visual, LIDAR, SONAR, RADAR) used by the vehicle for navigation.

18. A system for testing autonomous vehicles includes one or more processors coupled to memory, the memory loaded with computer instructions, that when executed on the processors, implement the shielding, receiving, accessing, generating and feeding of claim 11.

19. A tangible non-transitory computer readable storage media impressed with computer program instructions that, when executed, test a connected vehicle that is connected to other vehicles and/or infrastructure, including shielding a cellular receiving antenna of the connected vehicle from ambient cellular signals while the connected vehicle is under test and supplanting the ambient cellular signals with simulated cellular signals;

using a cellular signal generating system, receiving the ambient cellular signals and ambient Global Navigation Satellite System (abbreviated GNSS) signals using at least one antenna of the cellular signal generating system and determining a location and acceleration of the connected vehicle from the ambient GNSS signals;

accessing a model of an augmented environment that includes at least multi-pathing and obscuration of the ambient cellular signals along a test path, based on the location determined from the cellular signals;

generating the simulated cellular signals to feed to the connected vehicle, in real time, simulating with at least one vehicle and/or infrastructure source modified according to the augmented environment, based on for the location determined from the cellular signals; and feeding the simulated cellular signals to a receiver in the connected vehicle, thereby supplanting ambient cellular as the connected vehicle travels along the test path.

20. A system for testing a connected vehicle that is connected to other vehicles and/or infrastructure, includes one or more processors coupled to memory, the memory loaded with computer instructions, that when executed on the processors, implement the shielding, receiving, accessing, generating and feeding of claim 19.

* * * * *